(12) United States Patent
Tamura et al.

(10) Patent No.: US 11,198,159 B2
(45) Date of Patent: Dec. 14, 2021

(54) ARTICLE SORTING APPARATUS

(71) Applicant: ANRITSU INFIVIS CO., LTD., Kanagawa (JP)

(72) Inventors: Junichi Tamura, Kanagawa (JP); Koji Koizumi, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 80 days.

(21) Appl. No.: 16/478,187

(22) PCT Filed: Apr. 5, 2018

(86) PCT No.: PCT/JP2018/014561
§ 371 (c)(1),
(2) Date: Jul. 16, 2019

(87) PCT Pub. No.: WO2018/190238
PCT Pub. Date: Oct. 18, 2018

(65) Prior Publication Data
US 2020/0023410 A1 Jan. 23, 2020

(30) Foreign Application Priority Data
Apr. 11, 2017 (JP) .............................. JP2017-077965

(51) Int. Cl.
*B07C 5/36* (2006.01)
*B65G 43/02* (2006.01)
(Continued)

(52) U.S. Cl.
CPC ........... *B07C 5/361* (2013.01); *G01M 5/0066* (2013.01); *B07C 5/362* (2013.01)

(58) Field of Classification Search
CPC ........... B07C 5/361; B07C 5/362; B07C 5/36; G01M 5/0066; B65G 43/02; B65G 47/46; B65G 47/82
(Continued)

(56) References Cited

U.S. PATENT DOCUMENTS 6,607,065 B2 8/2003 Peppel
2007/0005184 A1 1/2007 Yamamoto

FOREIGN PATENT DOCUMENTS

JP 2000-238913 A 9/2000
JP 2004-077334 A 3/2004
(Continued)

OTHER PUBLICATIONS

Kaneoka Toshitomo, "Monitoring Device, Monitoring Program, and Monitoring Method (English Translation)", Apr. 2015, worldwide. espacenet.com (Year: 2015).*
(Continued)

*Primary Examiner* — Charles A Fox
*Assistant Examiner* — Molly K Devine
(74) *Attorney, Agent, or Firm* — Pearne & Gordon LLP (57) ABSTRACT

An article sorting apparatus, comprising a sorting mechanism (23) that performs a sorting operation to convey an inspected article (W) in one of a plurality of sorting directions (D1, D2 and D3); and a control unit that receives a sorting control signal (RJ) and controls operation of the sorting mechanism (23), wherein the sorting mechanism (23) includes rejection arms (31, 32) that change posture between a rejection posture where the rejection arms contact with the article (W) to change the conveyance direction to a specific sorting direction (D2 or D3) and a pass allowance posture where the rejection arms allow the article (W) to pass without contacting with the article, and air cylinders (33A, 33B) that operate the rejection arms to change the
(Continued)

posture thereof, and an acceleration sensor (61) and a detection unit (62) and a deterioration determination circuit (46) that determines the deterioration of the movable portion (23M).

4 Claims, 9 Drawing Sheets

(51) Int. Cl.
  *B65G 47/46* (2006.01)
  *B65G 47/82* (2006.01)
  *G01M 7/00* (2006.01)
  *G01M 5/00* (2006.01)

(58) Field of Classification Search
  USPC .......................................................... 209/546
  See application file for complete search history.

(56) References Cited

FOREIGN PATENT DOCUMENTS

| | | | |
|---|---|---|---|
| JP | 2006-168982 A | 6/2006 | |
| JP | 2007-008645 A | 1/2007 | |
| JP | 2008-094543 A | 4/2008 | |
| JP | 1478560 B2 | 6/2010 | |
| JP | 2010-208850 A | 9/2010 | |
| JP | 2014-055070 A | 3/2014 | |
| JP | 2015078884 A * | 4/2015 | ............. G01H 17/00 |
| JP | 2016-060616 A | 4/2016 | |

OTHER PUBLICATIONS

International Search Report Issued in Patent Application No. PCT/JP2018/014561 dated Jul. 3, 2018.
Written Opinion Issued in Patent Application No. PCT/JP2018/014561 dated Jul. 3, 2018.

* cited by examiner

ARTICLE SORTING APPARATUS

BACKGROUND OF THE INVENTION

Field of the Invention

The present invention relates to an article sorting apparatus, and in particular, to an article sorting apparatus that performs an operation of sorting inspected conveyed articles to destinations according to sorting control signals.

Description of the Related Art

There is known an article sorting apparatus, for example, a flipper type article sorting apparatus, adapted to operate upon reception of a command signal from an article inspection apparatus in the upstream side of an article inspection system for inspecting attributes, quality, and the like of various articles, so as to sort articles conveyed by the conveyor after the inspection to destinations according to the inspection result by operation of a sorting member on the conveying path of the conveyor.

Figure 7:
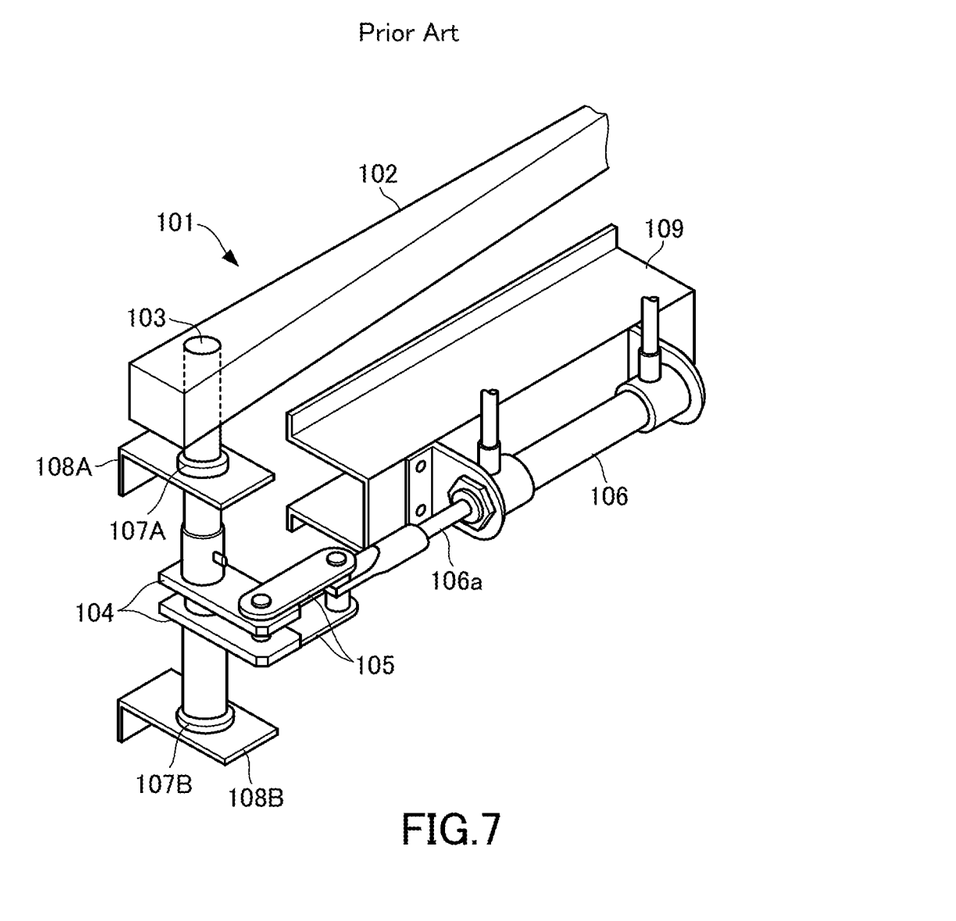
FIG. 7 is an external perspective view of a main part of a sorting mechanism of a conventional example.

As an example of this kind of conventional article sorting apparatus, for example, as shown in FIG. 7, an arm portion 102 of a sorting arm 101, rotating on a conveying path surface (not shown) is fastened in the upper end side of a drive shaft 103. The conventional article sorting apparatus has a drive cylinder 106 such as an air cylinder, capable of reciprocally rotating the drive shaft 103 via a rotation lever 104 and a link 105 attached to the lower end side of the drive shaft 103, an upper and a lower plates 108A, 108B that support the drive shaft 103 at a predetermined height position with respect to a housing (not shown) while supporting the drive shaft 103 rotatably via bearings 107A, 107B at two axial positions, and a base plate 109 that fixes the drive cylinder 106 with respect to the housing (see, for example, Patent Documents 1 and 2).

CITATION LIST

Patent Literature

Patent Document 1: Japanese Patent Application Publication No. 2000-238913
Patent Document 2: Japanese Patent No. 4478560

SUMMARY OF THE INVENTION

Technical Problem

In the above-described conventional article sorting apparatus, the arm portion 102 of the sorting arm 101 contacts with the article being conveyed so as to repeatedly perform a sorting operation of splashing or directing the article in a sorting direction which is deviating from the conveying direction, so that a relatively large vibration or shock is applied to a movable portion from the drive cylinder 106 to the arm portion 102 when the article conveyance speed and the weight are large, thereby causing a deterioration to occur that may lead to some failure.

When the deterioration progresses, there will occur, for example, a rattling of attachment of the cantilever support type arm portion 102 with respect to the drive shaft 103, an installation looseness (loosening of fastening) between the bearing 107A that rotatably supports the upper end side of the drive shaft 103 and the upper shaft support plate 108A, a vibration due to performance deterioration of the bearing 107A, a stick-slip of the piston rod 106a of the drive cylinder 106, and the like, thereby increasing vibrations and impacts in the sorting mechanism.

However, in the conventional article sorting apparatus, operators are not able to reliably grasp the occurrence of vibrations and impacts due to deterioration of the sorting mechanism during operation of the article sorting apparatus, so that there is a problem that it is impossible to prevent a failure from occurring because the connected deteriorated state is easily overlooked.

The present invention has been made to solve such conventional problems, and it is an object of the present invention to provide an article sorting apparatus which is capable of accurately detecting a loosening of attachment of a sorting member, a deterioration of an actuator, and the like, which are causes of vibration of a movable portion, thereby making it possible to securely prevent the occurrence of a failure of the sorting mechanism.

Means to Solve the Problem

In order to achieve the above object, the article sorting apparatus according to the present invention comprises: a sorting mechanism that performs sorting operation so as to convey articles to be conveyed after a predetermined inspection in one of a plurality of sorting directions; and a control unit that receives a sorting control signal corresponding to a result of the inspection and controls operation of the sorting mechanism, wherein, the sorting mechanism includes a sorting member that changes posture between a first sorting posture that the sorting member contacts with the article being conveyed to change a conveyance direction of the article to a specific sorting direction and a second sorting posture that the sorting member allows the article to pass in the conveyance direction without contacting with the article, and an actuator that operates the sorting member to change the posture thereof, the article sorting apparatus is provided with a vibration detection unit that detects vibration of a movable portion from the actuator of the sorting mechanism to the sorting member, and the control unit determines a deterioration state of the movable portion based on detection information of the vibration detection unit.

By this construction, in the present invention, when a vibration caused by the deterioration, such as looseness in the attachment of the sorting member, deterioration in the actuator, or the like occurs in the movable portion from the actuator of the sorting mechanism to the sorting member, the vibration is detected by the vibration detection unit. Therefore, such deterioration of the movable portion can be accurately detected, thereby making it possible to prevent the occurrence of failure of the sorting mechanism.

Note that the vibration detection unit detects the vibrational acceleration and frequency of the vibration of the movable portion, the timing of vibration generation with respect to the input of the sorting control signal, and the like, and may set the deterioration determination condition for each cause of the vibration of the movable portion. In addition, the control unit may output a signal as a result of determining the deterioration state of the movable portion.

In the present invention, the vibration detection unit detects a vibrational acceleration transmitted from the movable portion to a member supporting the movable portion during a first detection period set corresponding to the change of the posture of the sorting member, and the control unit calculates a vibrational acceleration level at the movable portion of the sorting mechanism during the first detection period based on the detection information from the vibration detection unit, and determines the presence of deterioration of the movable portion by comparing the calculated value with a preset first deterioration determination threshold value. With this construction, the presence or absence of deterioration of the movable portion can be determined in a short cycle with a simple process.

Further, the vibration detection unit may repeatedly detect a vibrational acceleration transmitted from the movable portion to a member supporting the movable portion, with respect to at least either one of a first detection period set corresponding to the change of the posture of the sorting member and a second detection period outside of the first detection period, and the control unit may estimate and calculate a degree of deterioration of the movable portion according to a strength and a number of repetitions of the vibration and impact, based on the detection information from the vibration detection unit, and may determine whether or not the movable portion is deteriorated by comparing the estimated and calculated value of the degree of deterioration with a preset second deterioration determination threshold value. By this construction, it is possible to precisely determine the degree of progress of deterioration of the movable portion according to the magnitude and the number of times of repetition of the impact input, thereby effectively preventing occurrence of failure in the sorting mechanism.

Furthermore, the article sorting apparatus according to the present invention may be so constructed that the control unit performs a first diagnosis mode in which the control unit detects a vibrational acceleration level of the movable portion during a first detection period set each time a posture of the sorting member is changed, based on the detection information from the vibration detection unit, and determines the presence of deterioration of the movable portion by comparing the vibrational acceleration level with a first determination threshold value, and a second diagnosis mode in which the control unit, when it is determined that the movable portion is deteriorated in the first diagnosis mode, estimates a degree of deterioration of the movable portion according to a strength and a number of repetition of the vibration and impact, based on the detection information from the vibration detection unit in the first detection period and the detection information from the vibration detection unit in a second detection period outside of the first detection period, and outputs a display data according to at least the degree of deterioration of the movable portion. By this construction, in general, whether or not the movable portion is deteriorated is determined in a short cycle with a simple process, while in necessity, the degree of progress of deterioration of the movable portion can be accurately determined according to the magnitude and the number of repetitions of the impact input.

The display data according to the degree of deterioration of the movable portion may be displayed in a different color depending on when the deterioration is not detected, when the deterioration is detected and the degree of deterioration of the movable portion is relatively low, and when the deterioration is detected and the degree of deterioration of the movable portion is relatively high. By this construction, it is possible to promptly and accurately notify the difference in deterioration determination result as a change in display color.

Effect of the Invention

According to the present invention, it is possible to provide an article sorting apparatus capable of accurately detecting the loosening of attachment of the sorting member, the deterioration of the actuator, and the like, which are the factors of the vibration of the movable portion, thereby securely preventing occurrence of failure of the sorting mechanism

DETAILED DESCRIPTION OF THE INVENTION

Hereinafter, embodiments for carrying out the present invention will be described with reference to the drawings.

FIGS. 1 to 6 show a weight sorting apparatus as an article inspection system including an article sorting apparatus according to one embodiment of the present invention.

First, the construction will be explained.

Figure 1:
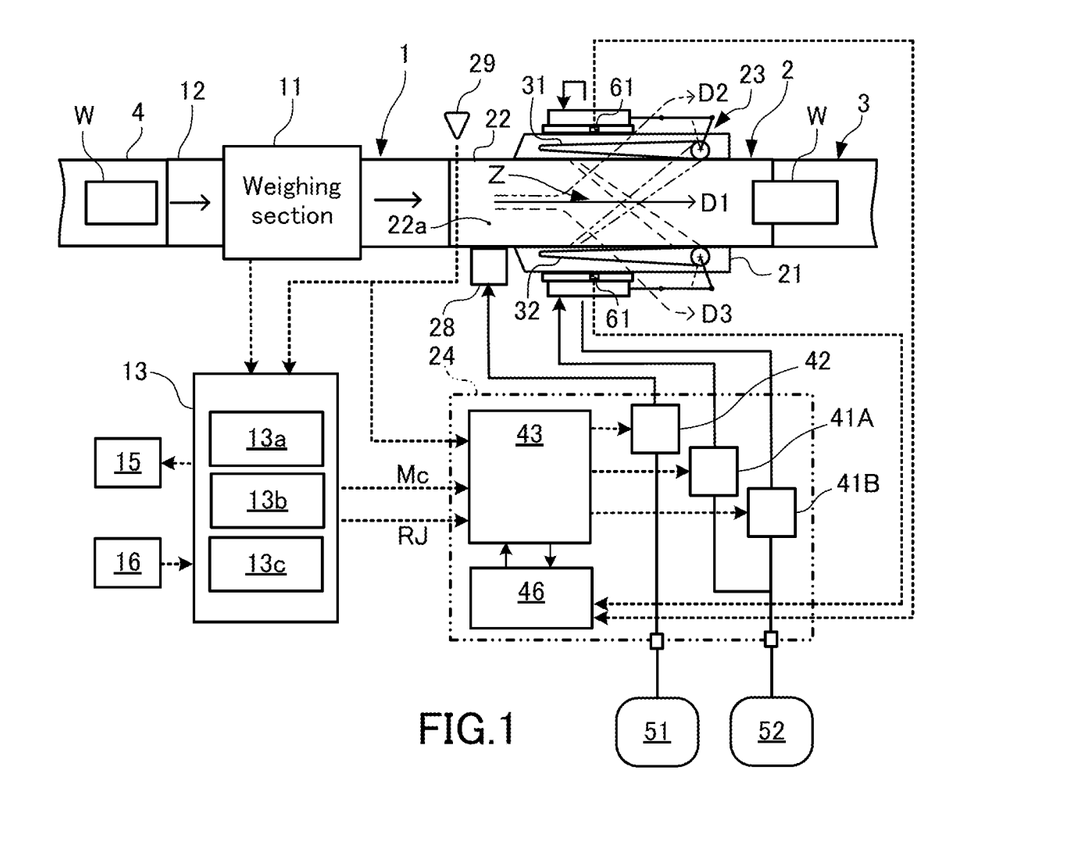
FIG. 1 is a system configuration diagram showing a schematic configuration of an article inspection system including an article sorting apparatus according to one embodiment of the present invention.

As shown in FIG. 1, the weight sorting apparatus according to the present embodiment includes: a weighing apparatus 1 having an article inspection apparatus, an infeed conveyor 4 functioning as a pre-stage conveyor and a weighing conveyor 12; and an article sorting apparatus 2 equipped with a conveyor where an inspected article W is conveyed in from the weighing apparatus 1, wherein the article W whose inspection result is OK is conveyed out to the conveyor 3 on the downstream side.

In the weighing apparatus 1, an article W which is an object to be inspected is sequentially loaded from an article loading means on the upstream side, constituted by, for example, a filling and packaging machine not shown.

The weighing apparatus 1 includes, for example, a weighing section 11 constituted by a known load cell or a load sensor such as an electromagnetic balance scale, a weighing conveyor 12 equipped with a weighing platform (not shown in detail) capable of applying a weight of the article W as a load to the weighing section 11 while conveying the article W, and a control unit 13 adapted to generate an inspection result signal based on a load signal from the weighing section 11 and a sorting control signal RJ corresponding to the load signal from the weighing section 11, so that the weight of the article W passing through the weighing conveyor 12 can be measured by the weighing section 11.

Further, the control unit 13 of the weighing apparatus 1 is adapted to generate a sorting control signal (for example, a classification of shortage and excess of weight or a plurality of types of sorting control signals for ranking) for sorting the article W to different destinations: the article W having a normal weight within an allowable range, for example, as a good item and the article W having excess or shortage in weight as a defective item, based on the load signal from the weighing section 11.

Although a specific hardware configuration is not shown, the control unit 13 includes, for example, a CPU, a ROM, a RAM, an input/output interface circuit, and the like, so as to control the operation of the weighing apparatus 1 and to control the operation of the article sorting apparatus 2 in accordance with a predetermined weighing (also called weight measuring) control program, a sorting control program for weight sorting, and the like stored in the ROM or other memory devices.

The control unit 13 includes an inspection control unit 13*a* for controlling the inspection by the weighing apparatus 1 by executing the above-described various control programs, a sorting control unit 13*b* for controlling the sorting operation of the article sorting apparatus 2 according to a command signal to be explained hereinafter and a storage unit 13*c* for storing various set values, inspection conditions, article type information, inspection results, history, and the like. In addition, the control unit 13 is provided with a display unit 15 as a display output unit for displaying and outputting various kinds of information such as examination results, and an input unit 16 capable of manually inputting various setting values and the like.

The inspection control unit 13*a* of the control unit 13 controls the operation of the weighing apparatus 1 according to preset parameters for each of article types and the specifications of the weighing apparatus 1, while performing the calculation processing of measured values by the weighing section 11 and the acceptance/rejection determination processing of the weight value as the inspection result, and the like.

The sorting control unit 13*b* of the control unit 13 is capable of outputting a conveyance drive request signal Mc requesting the operation of the article sorting apparatus 2 and instructing the conveyance drive of the belt conveyor 22 according to this conveyance drive request signal Mc. Further, the sorting control unit 13*b* is capable of generating a sorting control signal RJ corresponding to the inspection result for each of the articles W, and outputting the sorting control signal RJ to the article sorting apparatus 2 at the timing when the corresponding inspected article W reaches the predetermined sorting zone Z, and having the operation of the sorting mechanism 23 controlled in accordance with the sorting control signal RJ from the time when the article is conveyed into the sorting zone Z until the time when the article passes through or discharged.

The article sorting apparatus 2 performs a sorting operation for sorting, for example, a good item and a defective item to different destination in accordance with a command signal from the control unit 13 of the weighing apparatus 1.

Figure 2:
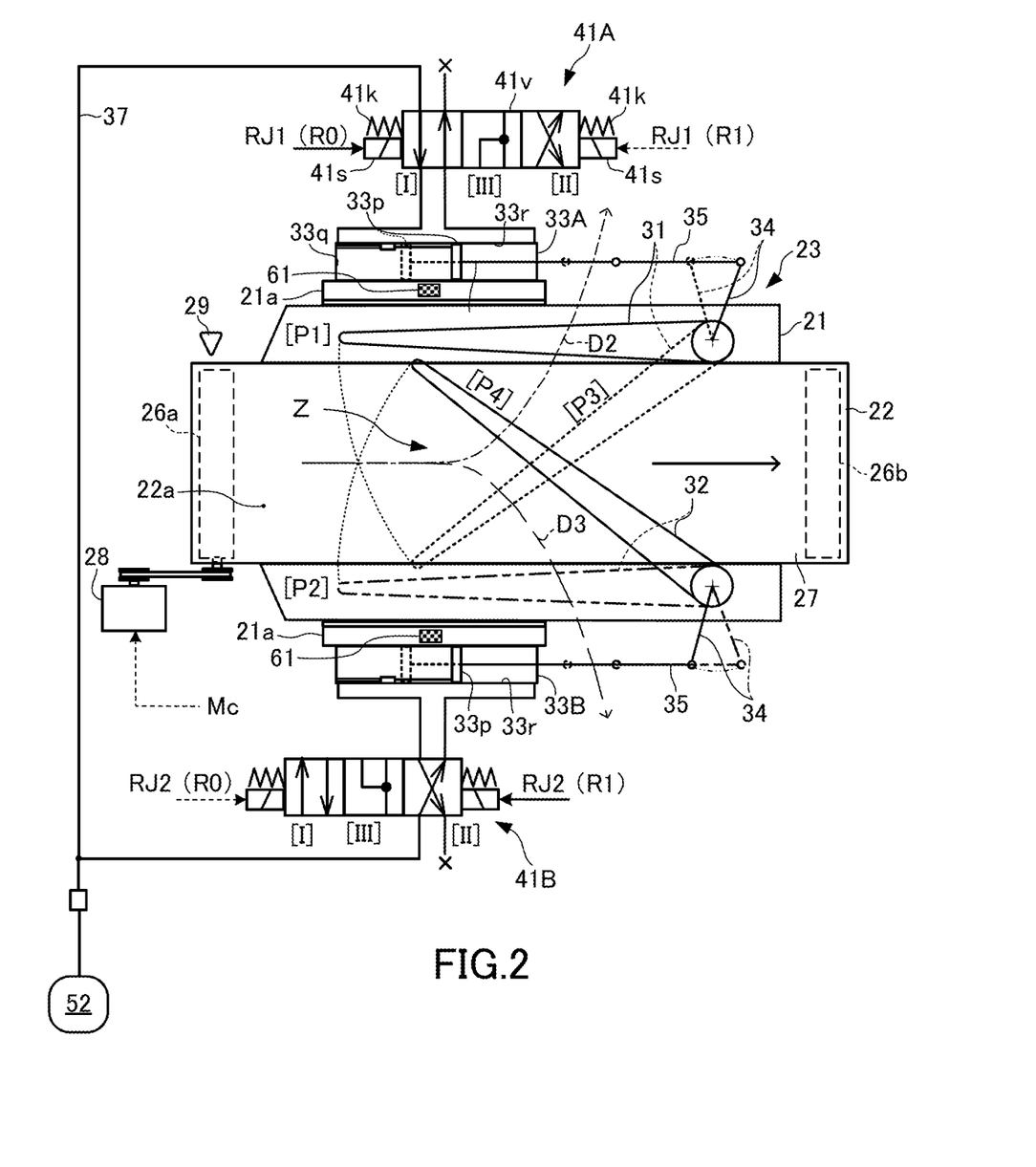
FIG. 2 is a schematic configuration diagram of a drive control system of a sorting mechanism of an article sorting apparatus according to one embodiment of the present invention.
Figure 3:
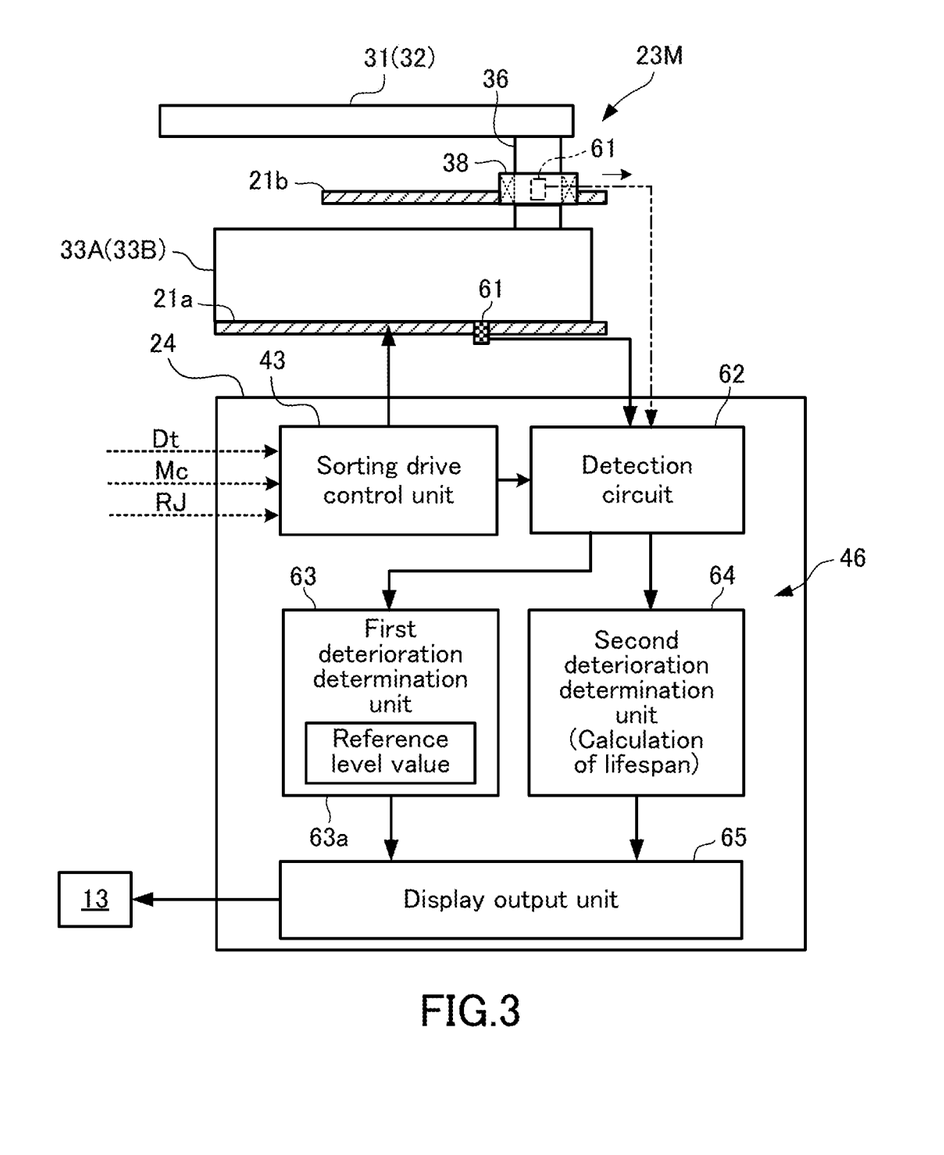
FIG. 3 is a schematic block configuration diagram of a vibration detection unit and a deterioration determination unit provided in a control unit of a sorting mechanism of an article sorting apparatus according to one embodiment of the present invention.

As shown in FIGS. 1 to 3, the article sorting apparatus 2 includes a housing 21, a belt conveyor 22 supported at a predetermined height position of the housing 21, a flipper-type sorting mechanism 23 provided in a predetermined sorting conveyance section of the belt conveyor 22 and a sorting control section 24 which is a control section for controlling operations of the belt conveyor 22 and the sorting mechanism 23.

Although not shown in detail, the belt conveyor 22 is provided with an endless belt 27 wound around a driving roller 26*a* and a driven roller 26*b*, and is supported by a housing 21, to be driven by a conveying motor 28 connected to a driving roller 26*a*.

The belt conveyor 22, when being conveyed and driven by the conveying motor 28, can convey an inspected article W that is carried from the upstream end of the conveying path 22*a* to the downstream side (the right side in FIG. 2) at a predetermined speed after the weight inspection as a predetermined article inspection is performed by the weighing device 1.

In the vicinity of the upstream end of the belt conveyor 22, an article detection sensor 29 for detecting the article W carried in from the weighing apparatus 1 is provided.

The article detection sensor 29 is disposed at a position where, for example, the article W is passed on from the weighing apparatus 1 to the article sorting apparatus 2 and conveyed to the article sorting apparatus 2 or at a position further upstream on the side of the side of the measuring apparatus 1 where the article is conveyed or the like. The article detection signal of the article detection sensor 29 is captured in respectively by the control unit 13 and the sorting control section 24, thereby making it possible for the control unit 13 to determine whether the article W is present on the article sorting apparatus 2 or on the weighing apparatus 1.

Meanwhile, the sorting mechanism 23 performs the sorting operation that conveys out the article W, which has been conveyed in along the conveying path 22*a* after the weight inspection as the predetermined article inspection on the weighing apparatus 1, into one of a plurality of sorting directions D1, D2 and D3 (including rejecting to the outside of the conveying path) in corresponding to the inspection result of the article W. The sorting direction D1 referred to here is, for example, a conveying direction of good items where the weight of the article W is within an allowable range with respect to the reference value, the sorting direction D2 is a conveying direction of excessive weight items where the weight of the article W is above an allowable range with respect to the reference value and the sorting direction D3 is a conveying direction of insufficient weight items where the weight of the article W is below an allowable range with respect to the reference value (hereinafter also simply referred to as "D1 direction", "D2 direction" and "D3 direction").

The sorting mechanism 23 has rejection arms 31, 32 as a plurality of members arranged on both sides in the width direction (vertical direction in FIG. 1) of the conveying path 22a of the belt conveyor 22.

Each the rejection arms 31, 32 constitutes a sorting member positioned on one side or the other side of the conveying path 22a. Each rejection arm 31, 32 can change its posture between a rejection posture in which each of rejection arm 31, 32 contacts with the article W being conveyed and change the conveying direction from the D1 direction, a straight traveling direction, to the D2 or D3 direction, a specific sorting direction (a rejection-side sorting posture inclined in the conveying direction and in the conveying path width direction with respect to the conveying path 22a, as indicated by a two-dot chain line and an imaginary line of a broken line in FIG. 1) and a pass allowance posture in which each of rejection arm 31, 32 allows the article W to pass in the conveying direction without contacting with the article W being conveyed (a passing-side posture substantially parallel along the conveying path 22a as shown by the solid line in FIG. 1). This means that each rejection arm 31, 32 is adapted to change the traveling direction by displacing the guide surface inclined with respect to the conveying path 22a of the belt conveyor 22 in the conveying path width direction.

However, the sorting member according to the present invention may be constituted by one member or more than one member arranged to be adjacent to each other in the conveying direction as long as the sorting member can be brought into contact with the article W being conveyed and oriented in the sorting direction. Further, the sorting mechanism according to the present invention may be constituted by inclining the conveying path 22a of the belt conveyor 22 in a vertical direction. For example, the sorting mechanism according to the present invention may be constituted by such a mechanism where the driving roller 26a and the driven roller 26b are spaced apart from each other in a direction parallel to the axis by a shaft support frame supported by the driving roller 26a to be vertically swingable up and down, while a sorting drive actuator, that swings the shaft support frame up and down, is provided between the shaft support frame and the housing 21.

As shown in FIG. 2, the sorting mechanism 23 is constructed by air cylinder 33A, 33B, which are a plurality of actuators independently drive the plurality of the rejection arms 31, 32 via corresponding the rotation operation lever 34 and link 35, and a pipe 37 connected to an external compressed air source 52.

Further, the air cylinders 33A and 33B respectively have a pair of pressure chambers 33q and 33r partitioned by the piston 33p, and the air cylinders 33A and 33B can be switched between an extended state and a contracted state by switching between supply and discharge of compressed air with respect to the pressure chambers 33q and 33r by a plurality of solenoid valves 41A, 41B. In addition, as shown in FIG. 3, each of the air cylinders 33A, 33B is detachably attached to a housing 21 via a cylinder attachment plate 21a.

Each of the solenoid valves 41A and 41B includes, for example, a pair of cylinder ports piped and connected to the pair of pressure chambers 33q and 33r of the corresponding air cylinder 33A or 33B, a supply pressure port connected to the compressed air source 52, and an discharge port opened to the atmosphere or an discharge port connected to a backpressure circuit (not numbered).

Further, each of the solenoid valves 41A and 41B has, with respect to its four ports, a valve body 41v that can be switched among three positions: an expansion side supply/discharge position [I]; a contraction side supply/discharge position [II]; and a non-supply/discharge position [III], a pair of valve springs 41k that urges the valve body 41v to the non-supply/discharge position [III] side so that a pair of cylinder ports are communicating each other while releasing to the air (releasing pressure to the atmosphere), a pair of solenoids 41s that can operate the valve body 41v toward either one of the expansion side supply/discharge position [I] or the contraction side supply/discharge position [II], against the springs 41k. Here, the pair of valve springs 41k are used for centering, and the valve body energizing direction of the pair of solenoids 41s is made different for switching between the expansion side supply/discharge position [I] and the contraction side supply/discharge position [II]. However, the present invention is not limited to this, and a combination of pilots and detents may be used. It is needless to say that each of the solenoid valves 41A, 41B can be a supply/discharge control valve capable of switching between the expansion side supply/discharge position [I] and the contraction side supply/discharge position [II], and a solenoid valve for release to the atmosphere can be arranged between the solenoid valves 41A, 41B and the air cylinder 33A or 33B.

Under the condition of being connected to the control unit 13 of the weighing apparatus 1, the sorting control section 24 that controls the operation of the sorting mechanism 23 controls the conditions such as the presence or absence of an article conveyed by the belt conveyor 22 under control of the conveying motor 28 and a velocity of the conveyance and the like, in accordance with the conveyance drive request signal Mc and the sorting control signal RJ which constitute control signals from the control unit 13 of the weighing apparatus 1, and based on the detection information of the article detection sensor 29, and controls an expansion/contraction state of the air cylinder 33A or 33B by switching the solenoid valves 41A, 41B, so that a plurality of rejection arms 31, 32 of the sorting mechanism 23 can be driven independently of each other.

The sorting control section 24 operates the conveying motor 28 in response to an operation start command requesting start of conveying of the article W by the belt conveyor 22, for example, the rise of the conveyance drive request signal Mc, and controls the operation of the sorting mechanism 23 in response to the input of the control signal RJ.

As shown in FIGS. 1 to 3, among the plurality of rejection arms 31, 32, the rejection arm 31 located on one side (upper side in FIG. 2) of the conveying path 22a can move between a one outside standby position [P1] that the rejection arm 31 takes a pass allowance posture along one side of the conveying path 22a, which is a sorting posture where the article W can pass in the conveying direction of the conveyor and an inside standby position [P3] that the rejection arm 31 takes a rejection posture which is a sorting posture where the article W being conveyed by the conveyor can be guided to the D2 direction when the article W reaches at the predetermined sorting zone Z on the conveying path 22a.

Further, among the plurality of rejection arms 31, 32, the rejection arm 32 located on the other side (lower side in FIG. 2) of the conveying path 22a can move between the other outside standby position [P2] that the rejection arm 32 takes a pass allowance posture along one side of the conveying path 22a, which is a sorting posture where the article W can pass in the conveying direction of the conveyor and an inside standby position [P4] that the rejection arm 32 takes a rejection posture which is a sorting posture where the article W being conveyed by the conveyor can be guided to the D3 direction when the article W reaches at the predetermined sorting zone Z on the conveying path 22a.

Furthermore, movable areas of the both of the rejection arms 31, 32 are exclusively set forth in such a manner that when any one of the rejection arms 31, 32 takes the inside standby position [P3] or [P4] in its movable area, the other one of the rejection arms 31, 32 cannot take the inside standby position [P4] or [P3] in its movable area.

Specifically, the sorting control section 24 includes a motor drive circuit 42 for driving a conveying motor 28 on the basis of an external power source, for example, electric power from a power source 51, the afore-mentioned solenoid valves 41A, 41B for controlling air supply/discharge to the air cylinder 33A, 33B from the external compressed air source 52, a sorting drive control unit 43 that constitutes a control unit such as a programmable controller that controls the operation of the solenoid valves 41A, 41B, an operation start button not shown and an operation stop button not shown.

The sorting control section 24 controls the operation of the conveying motor 28 and the solenoid valves 41A and 41B according to the conveyance drive request signal Mc and the sorting control signal RJ from the control unit 13 of the weighing apparatus 1 and other preset operation conditions, thereby to have the plurality of the rejection arms 31, 32 change between the pass allowance posture that enables conveyance of good items as shown by solid lines in FIG. 1 and the discharge posture that enables rejection of defective items as shown by imaginary lines (two-dot chain lines and broken lines) in FIG. 1, under the state of the article being conveyed by the belt conveyor 22.

As shown in FIGS. 1 and 3, the sorting control section 24 serving as a control section is provided therein with a deterioration determination unit 46 adapted to determine the presence or absence of a deterioration in each of the movable portions 23M based on vibration detection information at the two movable portions 23M from each of the air cylinders 33A and 33B that constitute an actuator to each of the rejection arms 31, 32 that constitute a sorting member and detect the abnormality and the state of decreased life due to the deterioration.

The deterioration determination unit 46 includes an acceleration sensor 61 that detects vibration and impact (a large vibrational acceleration in a short time) of a specific portion of each movable portion 23M as a vibrational acceleration, a detection circuit 62 that detects a vibration level in a main frequency band of the vibration caused by the deterioration of the movable portion 23M based on the detection information of the acceleration sensor 61, thereby to constitute a vibration detection unit together with the acceleration sensor 61, a first deterioration determination unit 63 and a second deterioration determination unit 64 that determine the deterioration state of each movable portion 23M based on the vibration detection information outputted by the detection circuit 62, and a display output unit 65 that generates determination result information corresponding to the determination result of the first deterioration determination unit 63 and the second deterioration determination unit 64 and outputs the determination result as display data. It should be noted that the sorting control section 24, the vibration detection unit, and the other functional units described here are constituted by resources including hardware resources such as CPU and memory and a predetermined control program, and function as a control means, a vibration detection means or other means by cooperating with sensors connected thereto and by cooperating with other resources on the network.

The deterioration determining unit 46 may output a signal indicative of the presence or absence of the deterioration of each movable portion 23M, or the abnormality and the state of decreased life due to the deterioration, as the above-described display data. This signal output may be a signal level defined as a high level or a low level corresponding to the presence or absence of the abnormality due to deterioration or a pulse signal indicating that the abnormality due to the deterioration has been detected. When a plurality of parts sorting apparatuses are used, a serial data signal of a predetermined length, including an ID (Identification) for identifying a device and information indicating a reduced life state may be outputted to a network-connected computer for management.

The movable portion 23M referred to here is constituted by a rejection arm 31 or 32 on one side or the other side of the belt conveyor 22, a piston 33p (including an output rod portion) of the air cylinder 33A or 33B, a rotation operation lever 34 and a link 35 constituting a transmission mechanism, an arm drive shaft 36 and an inner ring and a rolling element (not shown) of a bearing 38 for rotatably holding the arm drive shaft 36, and the like. The arm drive shaft 36 is rotatably supported via bearings 38 at two positions in the axial direction thereof (only one of which is shown in FIG. 3), and the arm drive shaft 36 is rotatably supported via a bearing attachment plate 21b at a predetermined height position with respect to the housing 21.

In addition, the specific portion is a portion where vibration and impact due to the deterioration (hereinafter simply referred to as "vibration/impact") is likely to occur when a state of the guide, holding, and coupling deteriorates at a sliding portion, a rolling portion, or a coupling portion in the movable portion 23M, and is set based on preliminary test results, maintenance information, failure examples, and the like.

The acceleration sensor 61 is attached to a fixed side member engaged to the specific portion of each movable portion 23M, and the direction in which the vibration is sensed is selected, so that the acceleration sensor 61 is less vulnerable to adverse effects such as excessive vibrations and impacts other than the above-mentioned vibration/impact of the specific portion, and in order not to cause deterioration of the sensor function due to the adverse effect or induce failure, each of the movable portions 23M. Thereby, the acceleration sensor 61 can stably and accurately detect the vibration/impact transmitted from the specific portion of the corresponding movable portion 23M.

Specifically, each acceleration sensor 61 is attached to, for example, at least either one of a position indicated by a solid line in FIG. 3 and a position indicated by an imaginary line. In other words, each acceleration sensor 61 is attached to the cylinder attachment plate 21a or the bearing attachment plate 21b which is a member that movably supports or guides the movable portion 23M or an attachment plate integrally formed by the cylinder attachment plate 21a and the bearing attachment plate 21b. Each acceleration sensor 61 may otherwise be attached to a cylinder portion of the air cylinders 33A and 33B or an outer race of the bearing 38 positioned between the cylinder attachment plate 21a or the bearing attachment plate 21b and the movable portion 23M.

The two systems of the acceleration sensor 61 for detecting the vibrations of the two systems of the movable portions 23M corresponding to the rejection arms 31 and 32, and the detection circuit 62 for receiving the detection information from these acceleration sensors 61, collectively constitute a vibration detection unit that detects vibration of the movable portion 23M.

Figure 4:
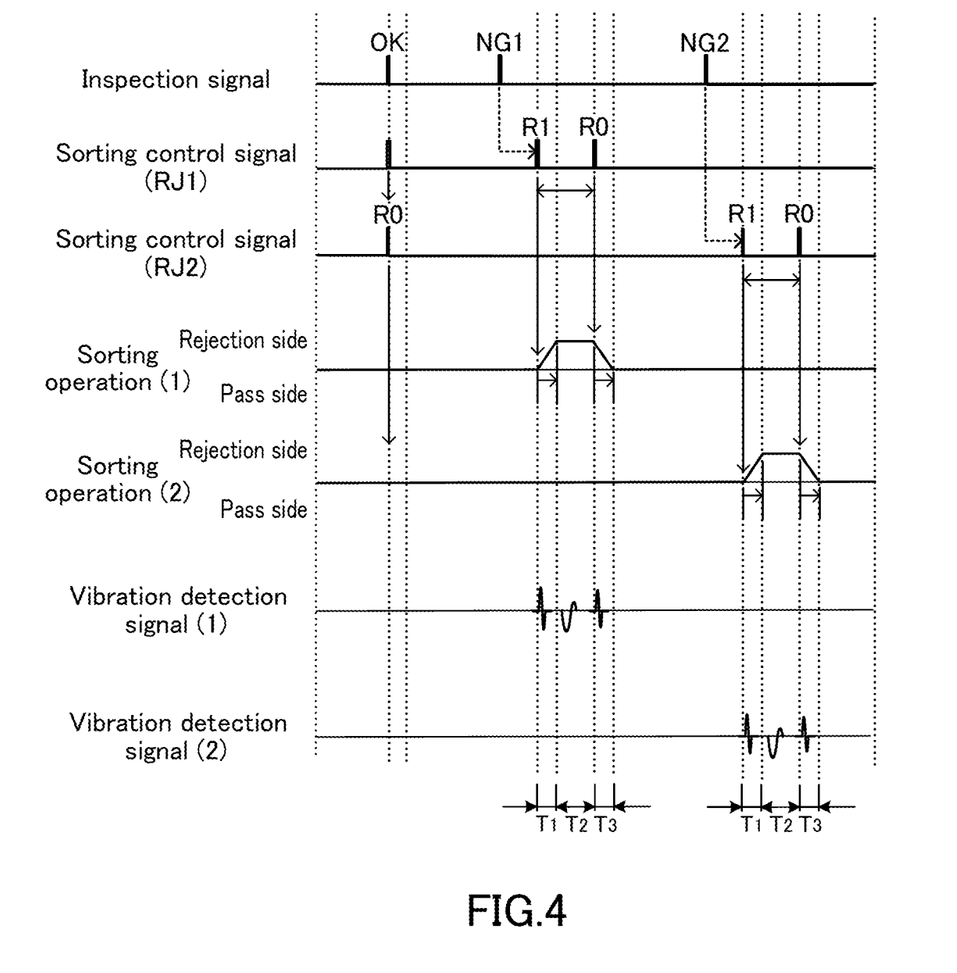
FIG. 4 is a timing chart exemplifying a sorting operation of the article sorting apparatus according to one embodiment of the present invention and vibrations generated accordingly.
Figure 5A:
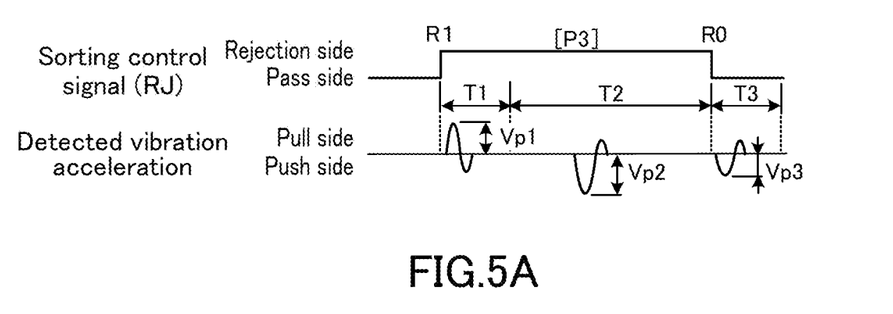
FIG. 5A is a timing chart for explaining a vibration detection condition corresponding to a first switching state of a sorting control signal for controlling a sorting mechanism of an article sorting apparatus according to one embodiment of the present invention.
Figure 5B:
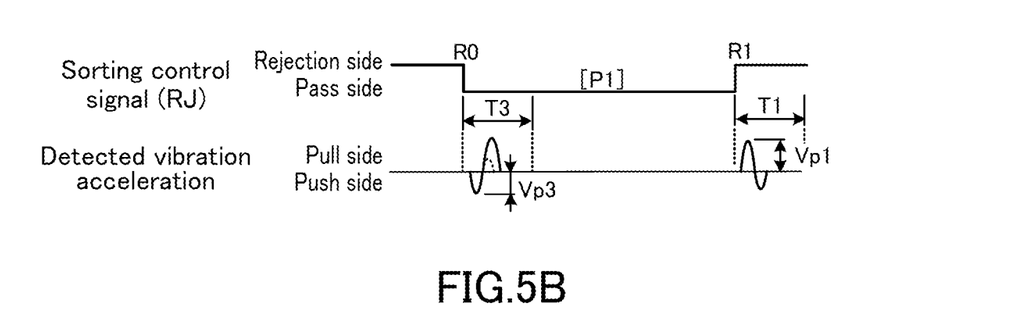
FIG. 5B is a timing chart for explaining a vibration detection condition corresponding to a second switching state of a sorting control signal for controlling a sorting mechanism of an article sorting apparatus according to one embodiment of the present invention.

As shown in FIGS. 4, 5A and 5B, the detection circuit 62 is adapted to detect the detection information (sorting control signals (1), (2) in FIG. 4) of the two systems of acceleration sensors 61 corresponding to the rejection arms 31, 32 set in correspondence with at least the posture change of the rejection arms 31 and 32 (a change in posture from any one of the above-mentioned pass allowance posture and discharge posture to the other), respectively for the first detection period T1, T3.

Specifically, the detection circuit 62 obtains the sorting control signal RJ from the sorting drive control unit 43, and, as shown in FIGS. 5A and 5B, outputs the serial detection values Vp1, Vp3 of the vibrational acceleration at specific portions of the movable portion 23, based on the detection information of the acceleration sensor 61, at the time of switching the sorting control signal RJ which has the posture of the rejection arms 31, 32 changed, and in the detection period T1, T3 which is a relatively short constant time, immediately after the switching (immediately after switching from any one to the other of the afore-mentioned sorting control signal R0 that controls to the pass allowance posture and the afore-mentioned sorting control signal R1 that controls to the discharge posture), with respect to a specific vibration frequency band corresponding to at least one kind of the deterioration and the failure of the movable portion 23M.

The first deterioration determination unit 63, based on the detection values Vp1 and Vp3 which are vibration detection information from the detection circuit 62, calculates the peak value of the vibrational acceleration in the movable portion 23M of the sorting mechanism 23 for each of the detection periods T1 and T3 Value, an effective value, or a vibrational acceleration level which is a function thereof, for example, a vibrational acceleration level, and compares the calculated value to a reference level value 63a (first deterioration value The determination threshold value) preliminarily set forth as a vibration accelerator level capable of determining the deterioration, and judges the presence or absence of deterioration of the movable portion 23M, thereby to determine the presence or absence of a deterioration in the movable portion 23M.

The reference level value 63a here is at least one threshold value for deterioration determination set in advance and made into storage information. For example, the reference level value 63a is set forth as a deterioration determination threshold value for the specific vibration frequency band, per each of the kinds of deterioration portions such as the bearing 38 and the air cylinder 33A, 33B which are prone to be deteriorated in the movable portion 23M or per each installation location of the acceleration sensor 61.

The deterioration referred to here is a state in which the performance of the movable portion 23M is deteriorated to such an extent that the likelihood of a failure of the movable portion 23M increases within a certain period of time if the sorting mechanism 23 is continued to be used as it is. For example, the deterioration is a state in which the chattering vibration or the like due to the attachment back lash (loosening of fastening) of the bearing 38 which rotatably holds the upper end side of the arm drive shaft 36, and the rejection arms 31, 32 which damage the air cylinders 33A, 33B, with respect to the arm drive shaft 36, the attachment back lash of the bearing 38 with respect to the attachment plate 21b, the degradation of bearing performance of the bearing 38 or the stick-slip phenomenon of the piston rod 106a of the drive cylinder 106, are clearly appearing.

The first deterioration determination unit 63 may further calculate an increase amount from the previous value of the vibrational acceleration level (at the previous change of the posture) calculated on the basis of the detection values Vp1, Vp3 from the detection circuit 62, compare the calculated value of the increase amount with a deterioration determination threshold value which is equal to or larger than the variation degree of detection set in advance to determine the presence or absence of a significant deterioration of the movable portion 23M.

Further, the vibration detection unit constituted by the acceleration sensor 61 and the detection circuit 62 can detect the vibrational acceleration level not only the first detection periods T1, T3 set corresponding to the changes of the postures of the rejection arms 31, 32 but also the first detection periods T1, In the second detection period T2 other than the detection periods T1 and T3 of the first detection period T1 and the second detection period T2 in addition to the vibrational acceleration level of the movable portion 23M in the first detection periods T1 and T3 The vibrational acceleration level of the movable portion 23M can also be repeatedly detected.

In the second detection period T2, while the article W being conveyed contacts with the rejection arm 31 or 32 in the rejection posture to change its traveling direction, as a reaction thereof, there occurs a vibration/impact on the corresponding movable portion 23M Vibration/shock may occur.

Accordingly, based on the detection values Vp1, Vp2, and Vp3 which are vibration detection information from the detection circuit 62, the first deterioration determination unit 63 determines the presence or absence of a deterioration in the sorting mechanism 23 by comparing the vibrational acceleration level of the movable portion 23M of the sorting mechanism 23 with the corresponding reference level value 63a, with respect to each of the detection periods T1, T2, T3.

On the other hand, the second deterioration determination unit 64 determines, based on the detection information from the acceleration sensor 61, the degree of deterioration of the movable portion 23M, according to the strength of the vibration and the impact caused by the sorting of the articles due to the change of the posture of the rejection arms 31, 32 and the sorting of the article.

Figure 6A:
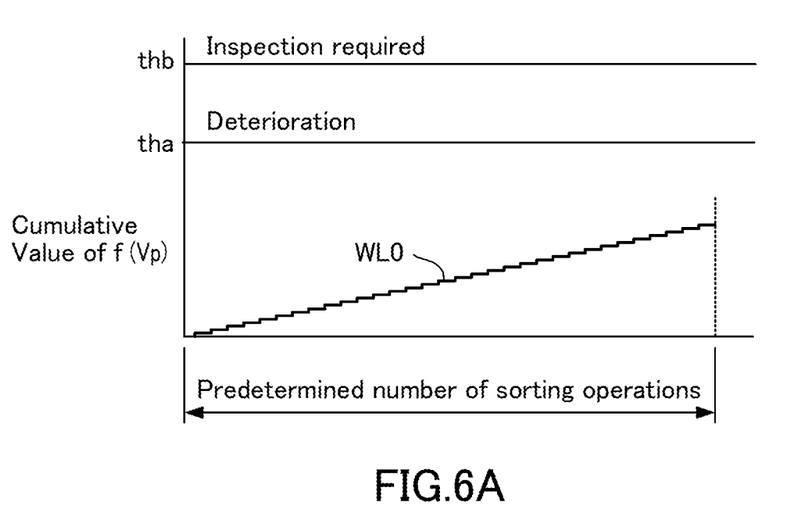
FIG. 6A is a graph for explaining deterioration determination conditions when to indirectly grasp the progress of deterioration accompanying repetition of sorting operations in the sorting mechanism of the article sorting apparatus according to one embodiment of the present invention as cumulative value of impact energy, and is showing the state before the deterioration determination.

Specifically, as shown in FIG. 6A, the second deterioration determination unit 64 sequentially performs cumulative calculations of the strength of the detected vibration/impact in accordance with the number of repetitions based on the significant vibration detection information in which the vibrational acceleration detected by the detection circuit 62 is equal to or greater than a predetermined value, thereby to estimates and calculates the degree of the deterioration of the movable portion 23M by the cumulative value (cumulative value of the vibration detection level f (Vp) in FIG. 6A). The process of estimating and calculating the degree of deterioration is performed separately for each of the detection periods T1, T2, T3, for example, but the strength of the detected vibration/impact may otherwise be estimated and calculated by sequentially accumulating the vibration/impact in accordance with the number of repetitions throughout the whole periods T1, T2, T3.

The second deterioration determination unit 64 further compares the estimated calculation value of the degree of deterioration with a preset second deterioration determination threshold value, and determines the presence or absence of a deterioration of the movable portion 23M taking the magnitude of the damages repeatedly received thereby into consideration.

Here, the second threshold value for deterioration determination is set, for example, as a first deterioration determination reference "tha" for determining whether or not the cumulative value of the vibration detection level f (Vp) in FIG. 6A reaches a timing at which the deterioration timing of the movable portion 23M is approaching or deterioration can occur, and as a second deterioration determination reference "thb" for determining whether or not the cumulative value of the vibration detection level f (Vp) in FIG. 6A reaches a timing at which the deterioration has progressed so that there can occur a failure.

The deterioration determining unit 46, having the first deterioration determination unit 63 and the second deterioration determination unit 64, is capable of performing: a first diagnosis mode in which the deterioration determining unit 46 detects the vibrational acceleration level of the movable portion 23M based on the detection information from the detection circuit 62 that constitutes the vibration detection unit in the first detection period T1, T3 set each time the posture of the rejection arms 31, 32 changes, and determines the presence or absence of a deterioration of the movable portion 23M by comparing the detected vibrational acceleration level with a first determination threshold value; and a second diagnosis mode in which, when it is determined that there is a deterioration of the movable portion 23M in the first diagnosis mode, the deterioration determining unit 46 estimates the degree of the deterioration of the movable portion 23M, based on the detection information from the detection circuit 62 in the first detection period T1, T3 and the detection information from the detection circuit 62 in the second detection period T2 which is outside of the first detection period T1, T3, in accordance with the strength of the vibration/impact and the number of repetitions.

It is needless to say that the deterioration determining unit 46 can switch between the first diagnostic mode and the second diagnostic mode. For example, with respect to the deterioration determining unit 46, it is possible to set either one of the first diagnosis mode or the second diagnosis mode based on preset item type or as necessity, or to set an automatic diagnosis mode, unlike a single mode, in which the second diagnosis mode is performed upon the deterioration determination by the first diagnosis mode as mentioned before. This means that three operation modes may be selectively set.

Furthermore, the deterioration determination unit 46 outputs the display image corresponding to the degree of deterioration of the movable portion 23M obtained by at least either one of the first deterioration determination unit 63 or the second deterioration determination unit 64 to the display output unit 65, or outputs the image data to the outside thereof as image data.

The display data in the display output section 65 corresponding to the degree of deterioration of the movable portion 23M is displayed in a different color depending on when the deterioration is not detected, when the deterioration is detected and the degree of the deterioration of the movable portion 23M is relatively low and when the deterioration is detected and the degree of the deterioration of the movable portion 23M is relatively high.

Figure 6B:
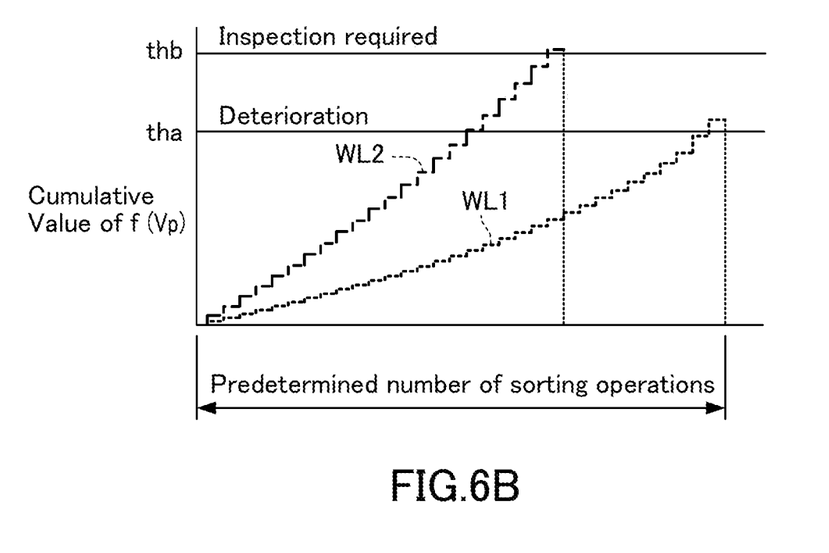
FIG. 6B is a graph for explaining deterioration determination conditions when to indirectly grasp the progress of deterioration accompanying repetition of sorting operations in the sorting mechanism of the article sorting apparatus according to one embodiment of the present invention as cumulative value of impact energy, and is showing the state at the time of the deterioration determination.

Specifically, for example, when the degree of vibration due to deterioration is increased compared to the degree of progress of normal deterioration such as the deterioration progress degree display line WL0 shown in FIG. 6A, and the cumulative value of the vibration detection level vibration detection level f (Vp) reaches the first deterioration determination reference "tha" as shown in the deterioration progress degree display line WL1 in FIG. 6B, the background or a part of the screen is displayed in yellow, and when the cumulative value of the vibration detection level vibration detection level f (Vp) reaches the second deterioration determination reference "thb" as shown in the deterioration progress degree display line WL2 in FIG. 6B, the background or a part of the screen is displayed in red.

It should be noted that, among the display screens colored by the first deterioration determination reference "tha" and the second deterioration determination reference "thb", the color area corresponding to the result of the current deterioration determination may be highlighted by displaying in higher luminance than the other display color areas, blinking or the like.

The deterioration determination unit 46 may be provided in the control unit 13 of the weighing apparatus 1 and may take in the detection information of the acceleration sensor 61 via the rejection drive control unit 43 of the sorting control section 24 and may output a serial data by a communication of the weighing apparatus 1. In this case, the display output unit 65 may be used in common with the display unit 15 on the side of the weighing apparatus 1 (the article inspection machine on the upstream side). Further, the article detection sensor 29 may be an article detection sensor installed on the input side of the weighing apparatus 1 and connected to the control unit 13.

Next, the operation will be described.

In the article inspection system of the present embodiment constructed as described above, the articles W, which are subjects to be inspected, are sequentially conveyed into the weighing apparatus 1 at a predetermined interval, and the weight inspection for each of the articles W is performed in the weighing apparatus 1, then the inspected article W is conveyed from the weighing apparatus 1 to the belt conveyor 22 of the article sorting apparatus 2.

Under this state, the article sorting apparatus 2 can convey the article W conveyed from the pre-stage weighing apparatus 1 in the same D1 direction as the conveying direction, so that the article W can be passed on to the rear stage conveyor 3 side, when the rejection arms 31, 32 take the aforementioned pass allowance posture substantially parallel to each other as indicated by the solid line in FIG. 1, in accordance with the sorting control signal from the control unit 13. Further, when one of the rejection arms 31, 32 takes the discharge posture shown by the imaginary line in FIG. 1, in accordance with the sorting control signal RJ from the control unit 13 of the weighing apparatus 1, the article sorting apparatus 2 can discharge the articles W conveyed from the weighing apparatus 1 of the pre-stage in the direction D2 or D3 deviating from the normal conveying path toward the rear stage conveyor 3.

When one of the plurality of solenoid valves 41A and 41B is switched to operate the corresponding air cylinder 33A or 33B, so that the rejection arm 31 or 32 which is drivingly connected thereto is rotated, since the rotation speed is relatively high, the articles W conveyed on the conveying path 22a of the belt conveyor 22 are laterally discharged from the conveying path 22a by the rejection arm 31 or 32, for example, the other rejection arm 32 as shown in FIG. 2.

In the sorting operation state in which the aforementioned sorting operation is performed, when there occurs a vibration of a predetermined level at specific portions that may result in a failure, for example, a vibration of the movable portion 23M due to a rattling of attachment of the rejection arms 31, 32, a chattering vibration of the air cylinders 33A, 33B or the like, at the movable portion 23M from the air cylinders 33A, 33B of the sorting mechanism 23 to the rejection arms 31, 32, the vibration is detected by the acceleration sensor 61 and the detection circuit 62.

Therefore, it is possible to accurately detect the loosening of attachment of the rejection arms 31, 32 and the deterioration of the air cylinders 33A, 33B, which cause such vibration of the movable portion 23M, thereby to prevent the occurrence of the failure of the sorting mechanism 23.

Further, in the present embodiment, the detection periods T1, T2, T3 are defined according to the sorting operation state, and the vibrational acceleration and the frequency of the movable portion 23M are detected by the acceleration sensor 61 and the detection circuit 62 with respect to the main vibration frequency band of the vibration for each deterioration factor at a specific portion. Therefore, it is possible to detect the type of vibration with respect to the input of the sorting control signal RJ (sorting command) from the control unit 13, and the timing of occurrence of the vibration and the like, thereby to accurately perform the deterioration determination for each factor of the occurrence of the vibration of the movable portion 23M.

Furthermore, in the present embodiment, since the acceleration sensor 61 constituting the vibration detection unit is attached to the cylinder attachment plate 21*a*, the bearing attachment plate 21*b*, and the like, which are members for movably supporting or guiding the movable portion 23M, stable vibration detection can be performed even if the vibration and impact transmitted to the movable portion 23M are repeatedly detected for each detection period set corresponding to the change of the posture of the rejection arms 31, 32.

Still further, based on the detection information from the acceleration sensor 61 and the detection circuit 62, the deterioration determination unit 46 calculates the detection values Vp1, Vp3 in the movable portion 23M of the sorting mechanism 23 during the first detection periods T1, T3, compares the calculated values with a preset first deterioration determination threshold value to determine the presence or absence of a deterioration of the movable portion 23M. Therefore, the presence or absence of a deterioration of the movable portion 23M can be determined in a short cycle with a simple process.

In addition, in the present embodiment, the vibration and the impact transmitted from the movable portion 23M to the member supporting the specific portion are repeatedly detected with respect to at least either one of the first detection period T1, T3 and the second detection period T2 other than the first detection period, and, based on the detection information, the degree of the deterioration of the movable portion 23M is estimated and calculated in accordance with the strength and the number of repetition of the vibration and the impact, and whether or not the movable portion 23M is deteriorated is determined by comparing the estimated and calculated value with the second deterioration determination threshold value. Therefore, it is possible to accurately and appropriately determine from the cumulative value of the impact which reflects the degree of progress of deterioration of the movable portion 23M, thereby to effectively prevent the occurrence of the failure in the sorting mechanism 23.

In the present embodiment, furthermore, when it is determined that there is a deterioration of the movable portion 23M in the first diagnostic mode, the second diagnosis mode is performed in which the degree of deterioration of the movable portion 23M is estimated and calculated according to the strength of vibration and impact and the number of repetitions. Therefore, in general, whether or not the movable portion 23M is deteriorated is determined in a short cycle with a simple process, while, in necessity, the degree of progress of deterioration of the movable portion 23M can be accurately determined according to the magnitude and the number of repetitions of the impact input.

Further, in the present embodiment, the display data corresponding to the degree of deterioration of the movable portion 23M is displayed in different colors depending on when the deterioration is not detected, when deterioration is detected and the degree of deterioration of the movable portion 23M is relatively low, and when the deterioration is detected and the degree of deterioration of the movable portion 23M is relatively high. Therefore, it is possible to promptly and accurately notify the difference of the deterioration determination result as a change of the display color, thereby making it possible to call attention that the maintenance inspection work is necessary at an appropriate time before the occurrence of the failure.

As described above, in the present embodiment, it is possible to accurately detect the loosening of attachment of the rejection arms 31 and 32 and the deterioration of the air cylinders 33A and 33B, which are causes of the vibration of the movable portion 23M, thereby making it possible to provide an article sorting apparatus that can reliably prevent the occurrence of a failure.

In the above-described embodiment, the first sorting member and the second sorting member are constituted by the rotating arm type like the rejection arms 31, 32. However, the first sorting member and the second sorting member may otherwise be constituted by a member that has a guide surface inserted obliquely with respect to the direction D1 which is a conveyance direction of the conveying path 22*a* and switches the conveying direction of the article W, through operations of entering and leaving the article conveying space on the conveying path 22*a*.

In addition, although the actuator for driving the rejection arms 31, 32 is constituted by the air cylinder 33A or 33B, the actuator may otherwise be constituted by an electromagnetic linear driving cylinder or a rotary solenoid rather than a fluid pressure operated type. Further, instead of the linear actuator, the actuator may otherwise be constituted by a motor or the like or a gear, a link or other transmission mechanism may be used in combination.

Furthermore, in the above-described embodiment, the article inspection apparatus in the article inspection system is constituted by the weighing apparatus 1. However it is needless to say that the article inspection apparatus may otherwise be constituted by various kinds of article inspection apparatus such as an X-ray inspection apparatus, a metal detector or the like.

As described above, the article sorting apparatus according to the present invention accurately detects the loosening of the sorting member attachment which is a factor of the vibration of the movable portion, the deterioration of the actuator, etc., and prevents the occurrence of the failure of the sorting mechanism which can be reliably prevented from occurring in an article sorting apparatus. The present invention is useful for an article sorting apparatus in general that performs an operation of sorting conveyed articles after inspection according to sorting control signals.

EXPLANATION OF REFERENCE NUMERALS

1 weighing apparatus
2 article sorting apparatus
3 rear stage conveyor
4 infeed conveyor
11 weighing section
12 weighing conveyor
13 control unit 15 display section
21 housing
21a cylinder attachment plate
21b bearing attachment plate
22 belt conveyor
22a conveying path
23 sorting mechanism
23M movable portion
24 sorting control section
28 conveying motor
29 article detection sensor
31, 32 rejection arm
33A, 33B air cylinder
33p piston
38 bearing
43 sorting drive control unit
46 deterioration determination unit
61 acceleration sensor
62 detection circuit
63 first deterioration determination unit
63a reference level value
64 second deterioration determination section
65 display output unit
D1 conveyance direction
D2, D3 rejection direction
R0 sorting control signal
R1 sorting control signal
RJ sorting control signal
T1, T3 first detection period
T2 second detection period
Vp1, V2, Vp3 vibrational acceleration
[P1], [P2] outside standby position
[P3], [P4] inside standby position

What is claimed is:

1. An article sorting apparatus, comprising:
a sorting mechanism that performs sorting operation so as to convey articles to be conveyed after a predetermined inspection in one of a plurality of sorting directions; and
a control unit that receives a sorting control signal corresponding to a result of the inspection and controls operation of the sorting mechanism, wherein:
the sorting mechanism includes a sorting member that changes posture between a first sorting posture where the sorting member contacts with the article being conveyed to change a conveyance direction of the article to a specific sorting direction and a second sorting posture where the sorting member allows the article to pass in the conveyance direction without contacting with the article, and an actuator that operates the sorting member to change the posture thereof,
the article sorting apparatus is provided with a vibration detection unit that includes an acceleration sensor to detect vibration of a movable portion from the actuator of the sorting mechanism to the sorting member each time a posture of the sorting member is changed, the acceleration sensor detecting a vibrational acceleration transmitted from the movable portion to a member supporting the movable portion, and detecting the vibrational acceleration during a first detection period set corresponding to the sorting control signal for controlling operation of the sorting member, and
the control unit calculates a vibrational acceleration level during the first detection period based on the detection information from the vibration detection unit, and determines a deterioration state of the movable portion by comparing the calculated value with a preset first deterioration determination threshold value based on detection information of the vibration detection unit,
wherein the first detection period is a time period during which the sorting member changes posture from the second sorting posture to the first sorting posture.

2. The article sorting apparatus according to claim 1, wherein:
the vibration detection unit repeatedly detects the vibrational acceleration for at least either one of the first detection period and a second detection period outside of the first detection period, and
the control unit estimates and calculates a degree of deterioration of the movable portion according to a strength and a number of repetition of the vibration and impact, based on the detection information from the vibration detection unit, and determines the presence of deterioration of the movable portion by comparing the estimated and calculated value of the degree of deterioration with a preset second deterioration determination threshold value,
wherein the second detection period is a time period during which the sorting member is in the first sorting posture.

3. The article sorting apparatus according to claim 1, wherein the control unit performs:
a first diagnosis mode in which the control unit determines the presence of deterioration of the movable portion by comparing the vibrational acceleration level with the first deterioration determination threshold value, and
a second diagnosis mode in which the control unit, when it is determined that the movable portion is deteriorated in the first diagnosis mode, estimates a degree of deterioration of the movable portion according to a strength and a number of repetition of the vibration and impact, based on the detection information from the vibration detection unit in the first detection period and the detection information from the vibration detection unit in a second detection period outside of the first detection period, and outputs a display data according to at least the degree of deterioration of the movable portion,
wherein the second detection period is a time period during which the sorting member is in the first sorting posture.

4. The article sorting apparatus according to claim 3, wherein the display data according to the degree of deterioration of the movable portion is displayed in a different color depending on when the deterioration is not detected, when the deterioration is detected and the degree of deterioration of the movable portion reaches a first threshold but does not reach a second threshold that is greater than the first threshold, and when the deterioration is detected and the degree of deterioration of the movable portion reaches the second threshold.

* * * * *